(12) United States Patent
Groeter et al.

(10) Patent No.: US 10,404,195 B2
(45) Date of Patent: Sep. 3, 2019

(54) METHOD, DRIVE SYSTEM AND VEHICLE

(71) Applicant: Robert Bosch GmbH, Stuttgart (DE)

(72) Inventors: Hans-Peter Groeter, Vaihingen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/300,900

(22) PCT Filed: Mar. 25, 2015

(86) PCT No.: PCT/EP2015/056427
§ 371 (c)(1),
(2) Date: Sep. 30, 2016

(87) PCT Pub. No.: WO2015/150190
PCT Pub. Date: Oct. 8, 2015

(65) Prior Publication Data
US 2017/0025975 A1    Jan. 26, 2017

(30) Foreign Application Priority Data

Apr. 4, 2014 (DE) .................. 10 2014 206 482
Mar. 25, 2015 (DE) .................. 10 2015 205 432

(51) Int. Cl.
*H02P 6/16* (2016.01)
*H02P 6/17* (2016.01)
*G01P 3/488* (2006.01)

(52) U.S. Cl.
CPC .............. *H02P 6/17* (2016.02); *G01P 3/488* (2013.01); *H02P 6/16* (2013.01)

(58) Field of Classification Search
CPC ....... H01L 2224/48091; H01L 2924/00; H01L 224/48247; H01L 2224/4842; B60C 23/0416
See application file for complete search history.

(56) References Cited

U.S. PATENT DOCUMENTS 5,117,681 A * 6/1992 Dosdall ................ F02D 41/009
                                                73/114.26
6,109,477 A * 8/2000 Myers ................... B67D 7/085
                                                222/1

(Continued)

FOREIGN PATENT DOCUMENTS

AT          510734        6/2012
DE       102004060299     6/2006

(Continued)

OTHER PUBLICATIONS

Translation of WO2007079511 has been attached.*

(Continued)

*Primary Examiner* — Bickey Dhakal
*Assistant Examiner* — Zoheb S Imtiaz
(74) *Attorney, Agent, or Firm* — Michael Best & Friedrich LLP

(57) ABSTRACT

The present invention discloses a method for controlling an electric machine, having an encoder wheel which has a multiplicity of teeth and at least one reference marking, having the steps: detecting the dynamics of the electric machine, detecting the positions of the teeth on the encoder wheel in relation to the at least one reference marking if the electric machine exhibits low dynamics, calculating a rotational speed of the electric machine on the basis of at least the detected positions, and controlling the electric machine on the basis of at least the calculated rotational speed. Furthermore, the present invention discloses a drivetrain and a vehicle.

11 Claims, 5 Drawing Sheets

(56) References Cited

U.S. PATENT DOCUMENTS

| | | | |
|---|---|---|---|
| 6,496,786 B1 | 12/2002 | Dieterle et al. | |
| 2002/0051028 A1* | 5/2002 | Kobayashi | B65H 5/062 347/19 |
| 2004/0238257 A1* | 12/2004 | Takahashi | B62D 5/006 180/402 |
| 2005/0121238 A1* | 6/2005 | Ishii | A63C 17/08 180/65.1 |
| 2006/0231313 A1* | 10/2006 | Ishii | A63C 17/12 180/218 |
| 2007/0157899 A1* | 7/2007 | Seufert | B60K 6/387 123/179.25 |
| 2009/0064774 A1* | 3/2009 | Panzer | F16D 21/06 73/115.04 |
| 2009/0105898 A1* | 4/2009 | Wu | B60W 20/50 701/33.7 |
| 2010/0050731 A1* | 3/2010 | Granig | G01D 5/145 73/1.11 |
| 2010/0156330 A1* | 6/2010 | Inoue | B60L 15/025 318/400.02 |
| 2011/0109305 A1* | 5/2011 | Galivel | F01D 21/003 324/207.25 |
| 2011/0147028 A1* | 6/2011 | Iwashita | H02P 23/14 173/176 |
| 2011/0290010 A1* | 12/2011 | Fulks | F02D 41/009 73/114.26 |
| 2013/0200210 A1* | 8/2013 | Oswald | B64C 25/405 244/50 |
| 2013/0216261 A1* | 8/2013 | Maeda | G03G 15/5008 399/167 |
| 2013/0272899 A1* | 10/2013 | Takahata | H02P 6/182 417/44.11 |
| 2013/0292992 A1* | 11/2013 | Cahill | B64C 25/405 301/6.2 |
| 2014/0354204 A1* | 12/2014 | Tachibana | H02P 6/08 318/473 |
| 2015/0362335 A1* | 12/2015 | Spitzer | G01B 7/30 310/68 B |

FOREIGN PATENT DOCUMENTS

| | | | |
|---|---|---|---|
| DE | 102008041307 | | 2/2010 |
| EP | 0506399 | A1 | 9/1992 |
| EP | 1107008 | A2 | 6/2001 |
| GB | 2159955 | A | 12/1985 |
| JP | 2007-022282 | * | 1/2007 |
| JP | 2007022282 | A * | 2/2007 |
| WO | 03100443 | | 12/2003 |
| WO | 2007079511 | | 7/2007 |
| WO | WO2007079511 | * | 7/2009 |
| WO | 2011098312 | | 8/2011 |

OTHER PUBLICATIONS

Translation of JP2007022282 has been attached.*
International Search Report for Application No. PCT/EP2015/056427 dated Jul. 2, 2015 (English Translation, 2 pages).

* cited by examiner

METHOD, DRIVE SYSTEM AND VEHICLE

BACKGROUND OF THE INVENTION

The present invention relates to a method for controlling an electric machine, having an encoder wheel which has a multiplicity of teeth and at least one reference marking. The present invention furthermore relates to a corresponding drive system and a corresponding vehicle.

Electric machines are used today in a multiplicity of applications. Electric machines are, e.g., particularly used in the automotive industry in order, in combination with an internal combustion engine or as a sole drive motor, to reduce the fuel consumption of a vehicle.

If the vehicle is driven by a combination of an internal combustion engine and an electric motor, it is referred to as a so-called hybrid vehicle. Depending on whether the internal combustion engine is arranged in series or in parallel with the electric motor, the vehicle is referred to as a series hybrid vehicle or as a parallel hybrid vehicle. Electric vehicles, on the other hand, have only an electric motor as the drive motor.

Due to the effort of the automobile industry to further reduce the fuel consumption of vehicles, such vehicles having electric drives will increasingly be used in the future. In the case of electric vehicles, the electric motor can, e.g., have a power output of 50 kW or more. In the case of hybrid vehicles, electric motors having a power output of approximately 15 kW-35 kW are typically used.

Power electronics, which control the torque and power output of the electric motors, are provided to actuate the electric motors. In so doing, this closed-loop control is based on at least one rotational speed signal which is detected in the electric motor.

The control quality depends greatly on the accuracy of the rotational speed detection. Hence, complex sensor systems, e.g. Vogt sensors or resolvers, are used, particularly in parallel hybrid vehicles and electric vehicles, to detect the rotational speed.

SUMMARY OF THE INVENTION

The present invention discloses a method, a drive system and a vehicle.

Provision is accordingly made for:

a method for controlling an electric machine, having an encoder wheel which has a multiplicity of teeth and at least one reference marking, having the steps: detecting the dynamics of the electric machine, detecting the positions of the teeth on the encoder wheel in relation to the at least one reference marking if the electric machine exhibits low dynamics, calculating a rotational speed of the electric machine on the basis of at least the detected positions, and controlling the electric machine on the basis of at least the calculated rotational speed.

Provision is furthermore made for:

a drive system comprising an electric machine, at least one encoder wheel, which is mechanically coupled to the electric machine and has a multiplicity of teeth and at least one reference marking, at least one sensor, which is disposed next to the encoder wheel and is designed to detect the teeth and the at least one reference marking of the encoder wheel and to emit a sensor signal which characterizes the movement of the teeth and the at least one reference marking, and a control device, which is coupled to the at least one sensor and is designed to detect positions of the teeth on the encoder wheel in relation to the at least one reference marking if the electric machine exhibits low dynamics and to control the electric machine at least on the basis of a rotational speed of said electric machine calculated on the basis of at least the detected positions.

Finally, provision is made for:

a vehicle comprising a drive system according to the invention which is designed to carry out a method according to the invention.

The insight underlying the present invention is that it is possible to detect the rotational speed of an electric machine not only with complex sensors. An encoder wheel and corresponding simpler sensors can, e.g., instead be used to calculate the rotational speed of the electric machine. It is however necessary to ascertain the tolerances of the encoder wheel in order to ensure a sufficient quality of the calculation of the rotational speed.

To this end, the present invention provides the method according to the invention.

Provision is accordingly made to detect the dynamics of the electric machine and wait for a moment in which the electric machine exhibits only low dynamics.

In this context, the term dynamics refers to the speed of a change in the rotational speed of the motor. The dynamics of a motor can, for example, be characterized by the first derivative of the motor speed. In order to acquire the dynamics of the electric machine, the difference between two consecutively acquired rotational speed values of the respective motor can therefore, e.g., be formed. The dynamics of a motor can however also, e.g., be assessed on the basis of the motor currents because high motor currents characterize a high torque, which typically results in an increase in the rotational speed.

The present invention is thus based on the assumption that the rotational speed of the electric machine is virtually constant if the dynamics are low. Thus, a moment of low dynamics can also be defined by the fact that the rotational speed of the electric machine is virtually constant at this moment.

If such a moment is detected, provision is made in the method for the positions of the individual teeth on the periphery of the encoder wheel to be detected in relation to the at least one reference marking.

Because the rotational speed is approximately constant at this moment or respectively in this phase, the positions of the individual teeth should be uniformly distributed across the periphery of the encoder wheel.

On the basis of the calculated positions, a rotational speed of the electric machine can subsequently be calculated, which can be used to control the electric machine.

If the calculation of the positions of the teeth yields that said teeth are not uniformly distributed across the periphery of the encoder wheel, the positions of the individual teeth can be corrected, e.g., by correction factors for the calculation of the rotational speed.

In one embodiment, when detecting the position of a respective tooth on the encoder wheel, the time is recorded which elapses before the respective tooth reaches the original position of the at least one reference marking. This allows for a very simple calculation of the positions of the individual teeth relative to the reference marking because a constant rotational speed of the electric machine is to be assumed.

In one embodiment, detecting the position of a respective tooth on the encoder wheel further comprises calculating the position of the respective tooth on the basis of the respective recorded time. Because the circumference of the encoder wheel is known, the positions of the individual teeth on the periphery of the encoder wheel can be calculated very easily with the aid of the recorded times.

In one embodiment, the positions of the teeth on the encoder wheel are detected multiple times, in particular twice or three times and particularly in relation to different positions on a periphery of the encoder wheel. If the positions of the teeth are detected at different positions, e.g. by different sensors, the accuracy of the acquisition of the rotational speed can be increased. If the positions for each sensor are separately detected, the sensor tolerances can likewise be compensated.

In one embodiment, the detection of the positions of the teeth on the encoder wheel in relation to the at least one reference marking if the electric machine exhibits low dynamics comprises detecting the positions of the teeth if the electric machine is not applying a drive torque and/or a decelerating torque. As a result, an approximately constant rotational speed of the electric machine can be ensured.

In one embodiment, the detection of the positions of the teeth on the encoder wheel in relation to the at least one reference marking, if the electric machine exhibits low dynamics, includes the opening of at least one clutch between the electric machine and components coupled to the electric machine. In so doing, the clutch is opened before the positions of the teeth on the encoder wheel are detected. This has the effect that no forces from the outside can act on the motor. Such forces can, for example, be braking torques or acceleration torques which act on a vehicle if it is not moving on a level stretch of road. If the clutch were not opened prior to detecting the positions, these forces could have the effect that the motor or respectively the rotor of the motor is accelerated or decelerated. This would increase the dynamics of the motor.

When detecting the positions of the teeth on the encoder wheel in relation to the at least one reference marking if the electric machine exhibits low dynamics, the excitation can additionally or alternatively be switched off if the electric machine is an asynchronous machine or a synchronous machine with electrical excitation. When detecting the positions of the teeth on the encoder wheel in relation to the at least one reference marking if the electric machine has low dynamics, an active short circuit can additionally or alternatively be adjusted if the electric machine is a permanently excited synchronous machine. As a result, an approximately constant rotational speed of the electric machine can be ensured.

In one embodiment, the positions of the teeth on the encoder wheel are further detected in relation to the at least one reference marking if the electric machine is under load. This makes it possible to recognize further inaccuracies in the calculation of the rotational speed, which, e.g., arise due to torsional vibrations, and to take said inaccuracies into account when calculating the rotational speed.

In one embodiment, the rotational speed of the electric machine is further calculated on the basis of data of a sensor-less detection of the rotational speed, in particular on the basis of voltages induced by the electric machine. As a result, it is possible to improve the accuracy of the calculation of the rotational speed.

The configurations of and modifications to the invention mentioned above can be combined in any useful manner with one another. Further possible configurations, modifications and implementations of the invention also do not comprise explicitly stated combinations of the features of the invention described above or below with respect to the exemplary embodiments. The person skilled in the art will particularly add individual aspects as improvements or enhancements to the respective basic form of the present invention.

In one embodiment, a plurality of teeth can, for example, be consolidated in each case into one tooth segment and the calculations can be carried out for the individual segments.

BRIEF DESCRIPTION OF THE DRAWINGS

The present invention is subsequently described in detail using the exemplary embodiments specified in the schematic figures of the drawings. In the drawings.

In all of the figures, identical or functionally identical elements and devices—provided nothing else is indicated—have been provided with the same reference signs.

DETAILED DESCRIPTION

Figure 1:
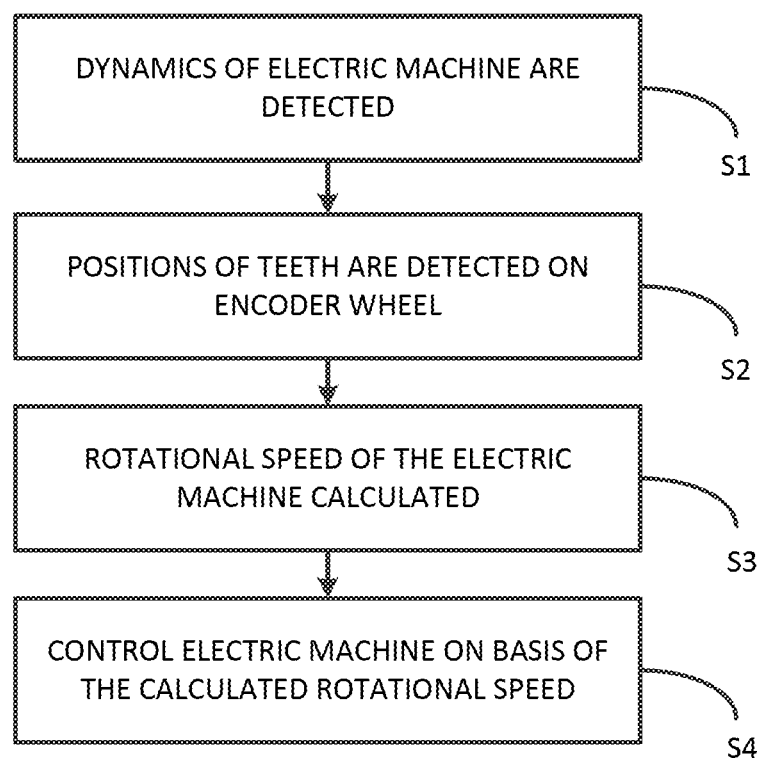
FIG. 1 shows a flow diagram of an embodiment of a method according to the invention.

FIG. 1 shows a flow diagram of an embodiment of a method according to the invention.

The method has four steps S1-S4.

In the first step S1, the dynamics of the electric machine 1 are detected. After that, positions of the teeth 3-1-3-*n* are detected on the encoder wheel 2 in a second step S2. This occurs particularly in relation to the at least one reference marking 4 and if the electric machine 1 exhibits low dynamics.

A phase of lower dynamics of the electric machine 1 can, e.g., be a phase in which the electric machine 1 does not apply a drive torque and/or a decelerating torque.

Such a phase can, e.g., be actively introduced. For example, at least one clutch 16 can be opened between the electric machine 1 and components 17-1, 17-2 coupled to the electric machine 1.

Additionally or alternatively, the excitation can be switched off if the electric machine 1 is an asynchronous machine 1 or a synchronous machine 1 with electrical excitation.

Furthermore, an active short circuit can be adjusted if the electric machine 1 is a permanently excited synchronous machine 1.

In a third step S3, a rotational speed of the electric machine 1 is subsequently calculated on the basis of at least the detected positions and is used for controlling the electric machine on the basis of the calculated rotational speed in a fourth step S4.

In one embodiment, provision can be made for the positions of the teeth 3-1-3-*n* on the encoder wheel 2 to be detected in relation to the at least one reference marking 4 if the electric machine 1 is under load, whereby it becomes possible to reduce inaccuracies during the calculation of the rotational speed, which, e.g., are produced by torsional vibrations.

The method according to the invention can be carried out once or also multiple times in a drive train 10.

Because the encoder wheel usually does not change after the production thereof, a learning process, in which the positions of the individual teeth 3-1-3-$n$ on the encoder wheel are detected and stored, can be carried out after the production of the drive train 10 or, e.g., a vehicle. These values can then be used to control the electric machine 1 during the operation of the drive train 10 or the vehicle 15.

The positions of the teeth 3-1-3-$n$ can, e.g., be cyclically checked during the operation of the drive train 10 or the vehicle 15. This can, e.g., be carried out once for each ignition cycle of the vehicle.

Figure 2:
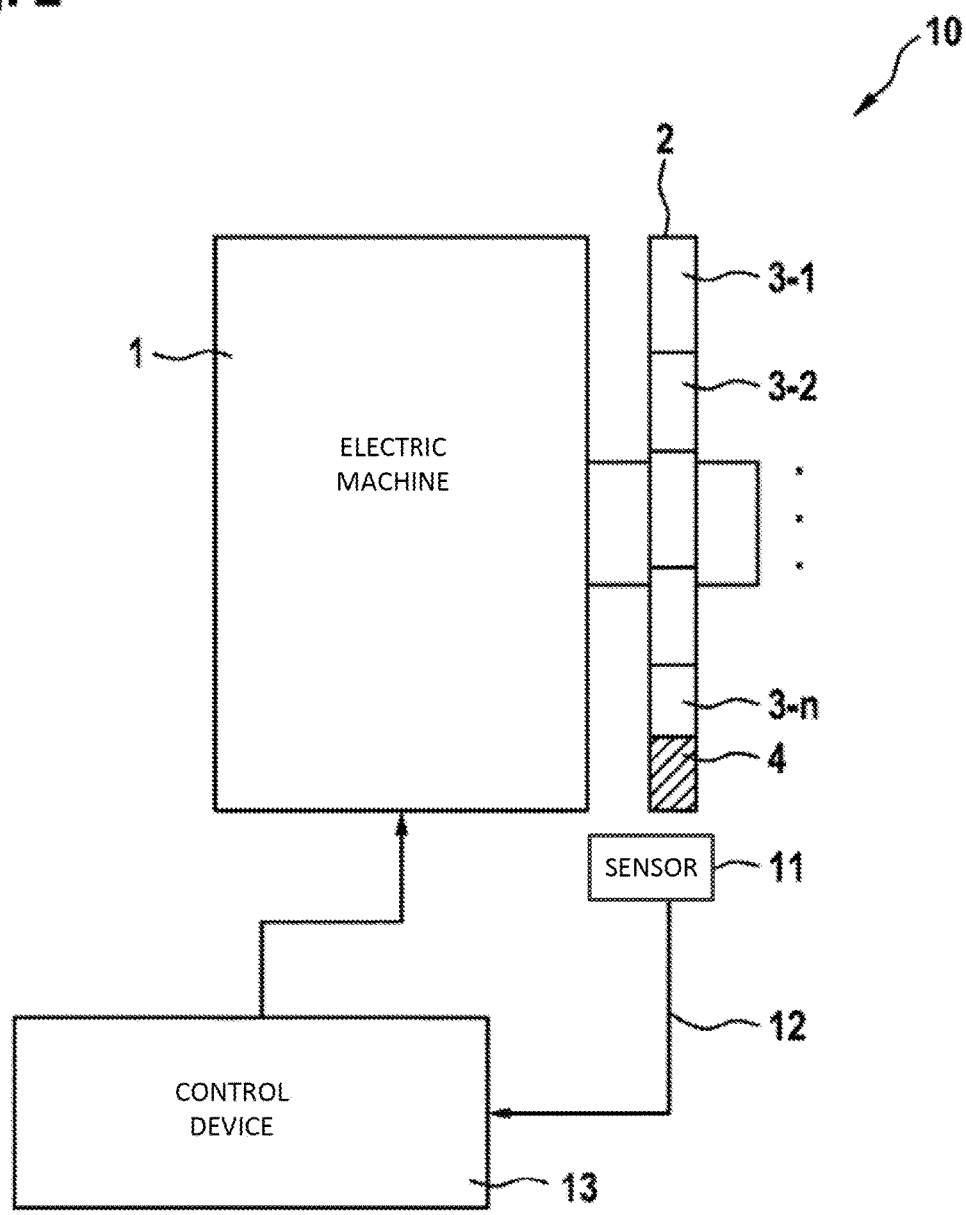
FIG. 2 shows a block wiring diagram of an embodiment of a drive system according to the invention.

FIG. 2 shows a block wiring diagram of an embodiment of a drive system 10 according to the invention.

The drive system 10 of FIG. 2 comprises an electric machine 1, which is coupled via the shaft thereof to an encoder wheel 2, which has a multiplicity of teeth 3-1-3-$n$ and a reference marking 4.

In addition to the encoder wheel 2, a sensor 11 is arranged in the drive system 10, said sensor being designed to detect the positions of the teeth 3-1-3-$n$.

The position detection can, e.g. take place indirectly. The sensor 11 can, for example, be a Hall sensor 11, which detects when one of the teeth 3-1-3-$n$ or the reference marking is in front of the sensor 11 or passes by said sensor. The sensor 11 emits a sensor signal 12, which comprises this information, for example an analog voltage or a digital signal which characterizes the Hall voltage in the Hall sensor 11.

The control device 13, which is coupled to the sensor 11, evaluates this signal in order to calculate the position of the teeth. If the electric machine 1 is in a state of low dynamics, it can be assumed that the rotational speed is approximately constant. If the reference marking 4 is detected by the sensor 11, the control device 13 can very easily calculate the positions of the individual teeth 3-1-3-$n$. In addition, the control device 13 can, e.g., determine the duration of one revolution by measuring the period of time between a first and a second detection of the reference marking 4.

In the case of an ideal encoder wheel 2 without tolerances, the individual teeth are uniformly distributed across the periphery of the encoder wheel 2. Dividing the duration of a revolution by the number of teeth thus yields the target position or the target time during the revolution of the individual teeth 3-1-3-$n$. Deviations from this target time can then be corrected by the control device 13 or can be included when calculating the rotational speed of the electric machine 1 from the sensor signal 12.

With respect to FIG. 2, the control device 12 was described in connection with an embodiment of the method according to the invention. The control device 12 can also be used with other embodiments of the method according to the invention.

Figure 3:
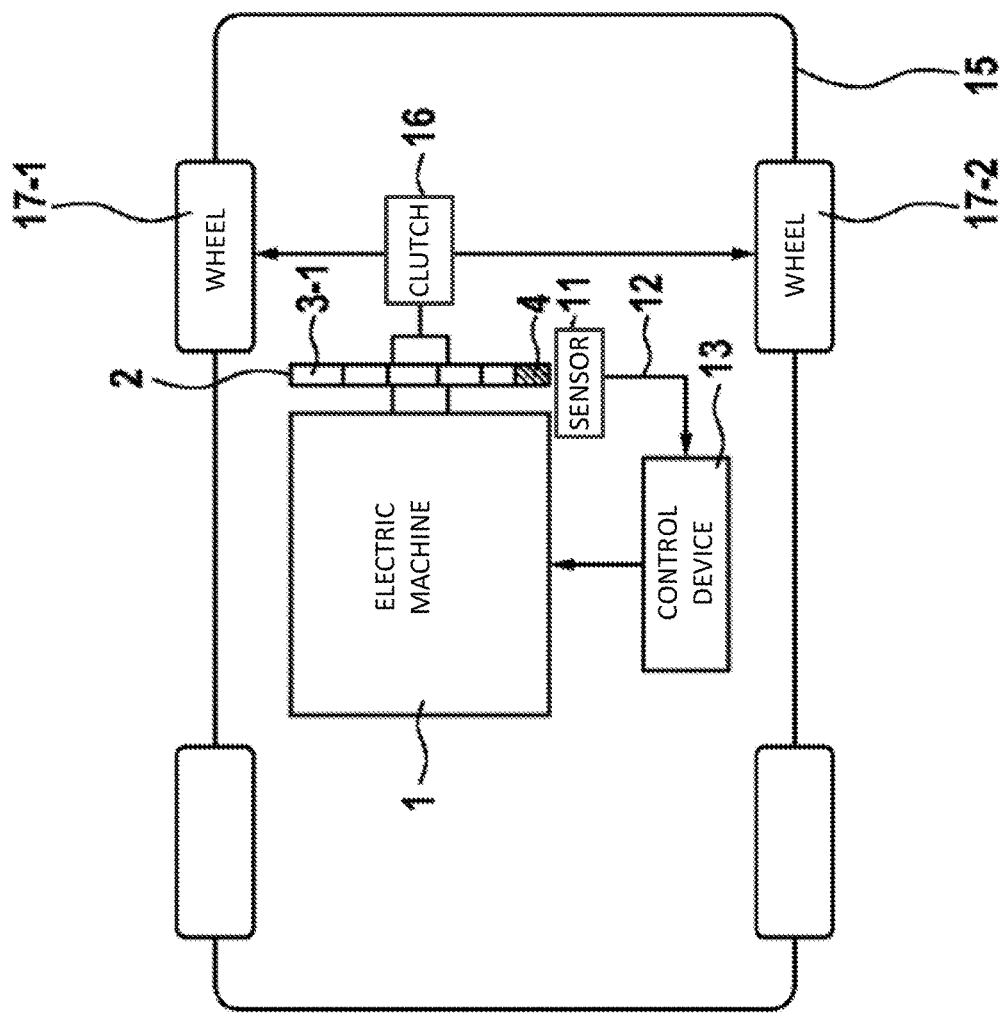
FIG. 3 shows a block wiring diagram of an embodiment of a vehicle according to the invention.

FIG. 3 shows a block wiring diagram of an embodiment of a vehicle 15 according to the invention.

The vehicle 15 comprises a drive system 10 which is coupled to the wheels 17-1 and 17-2 of the vehicle 15.

The drive system 10 is based on the drive system 10 of FIG. 2 and comprises an electric machine 1 which is coupled via the shaft thereof to the encoder wheel 2, which has a multiplicity of teeth 3-1-3-$n$ and a reference marking 4.

The electric machine 1 is furthermore coupled to a clutch 16, which connects the electric machine 1 to the wheels 17-1, 17-2 of the vehicle.

In order to generate a phase of the electric machine 1 exhibiting low dynamics, the clutch 16 can, e.g., be opened and the electric machine 1 can be controlled in such a manner that said machine applies neither a drive torque nor a braking torque.

The vehicle 15 of FIG. 3 is designed as a pure electric vehicle 15 which does not have a drive motor in addition to the electric machine 1.

In further embodiments, the vehicle 15 can, however, also be designed as a hybrid vehicle 15 which has a further drive motor, e.g. an internal combustion engine, besides the electric machine 1.

Figure 4:
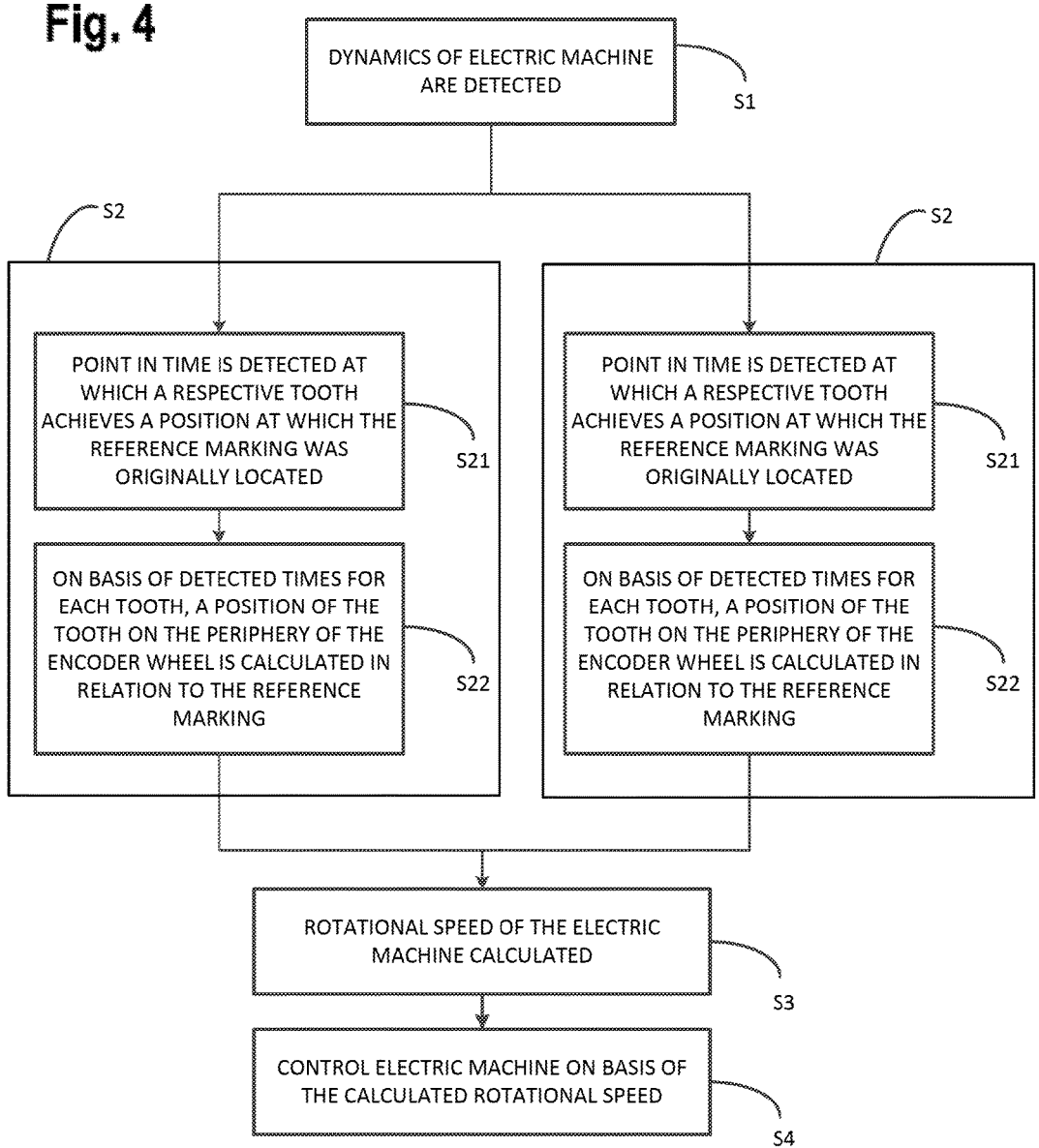
FIG. 4 shows a flow diagram of a further embodiment of a method according to the invention.

FIG. 4 shows a flow diagram of a further embodiment of a method according to the invention.

The method of FIG. 4 is based on the method of FIG. 1 and differs from said FIG. 1 to the extent that step S2 is carried out twice. Step S2 is thereby carried out for two different sensors 11. In further embodiments, step S2 can also be carried out three times for three different sensors 11 or more often.

Step S2 furthermore comprises respectively two sub-steps S21 and S22.

In step S21, the point in time is detected at which a respective tooth 3-1-3-$n$ achieves the position at which the reference marking 4 was originally located, that is to say at the beginning of the measuring process. For example, the position can be specified by the sensor 11 because the measurement usually begins if the reference marking is located in front of the sensor 11.

The time which elapses until the encoder wheel has rotated so far that the next tooth 3-1-3-$n$ is in front of the sensor 11 is therefore measured in each case.

On the basis of the detected times for each tooth 3-1-3-$n$, a position of the tooth on the periphery of the encoder wheel 2 is subsequently calculated in relation to the reference marking 2 in step S22.

A deviation of the detected or respectively calculated positions of the teeth 3-1-3-$n$ from the known target positions can then be calculated and stored.

When calculating the rotational speed, these deviations can then be used to correct the result of the calculation of the rotational speed.

Figure 5:
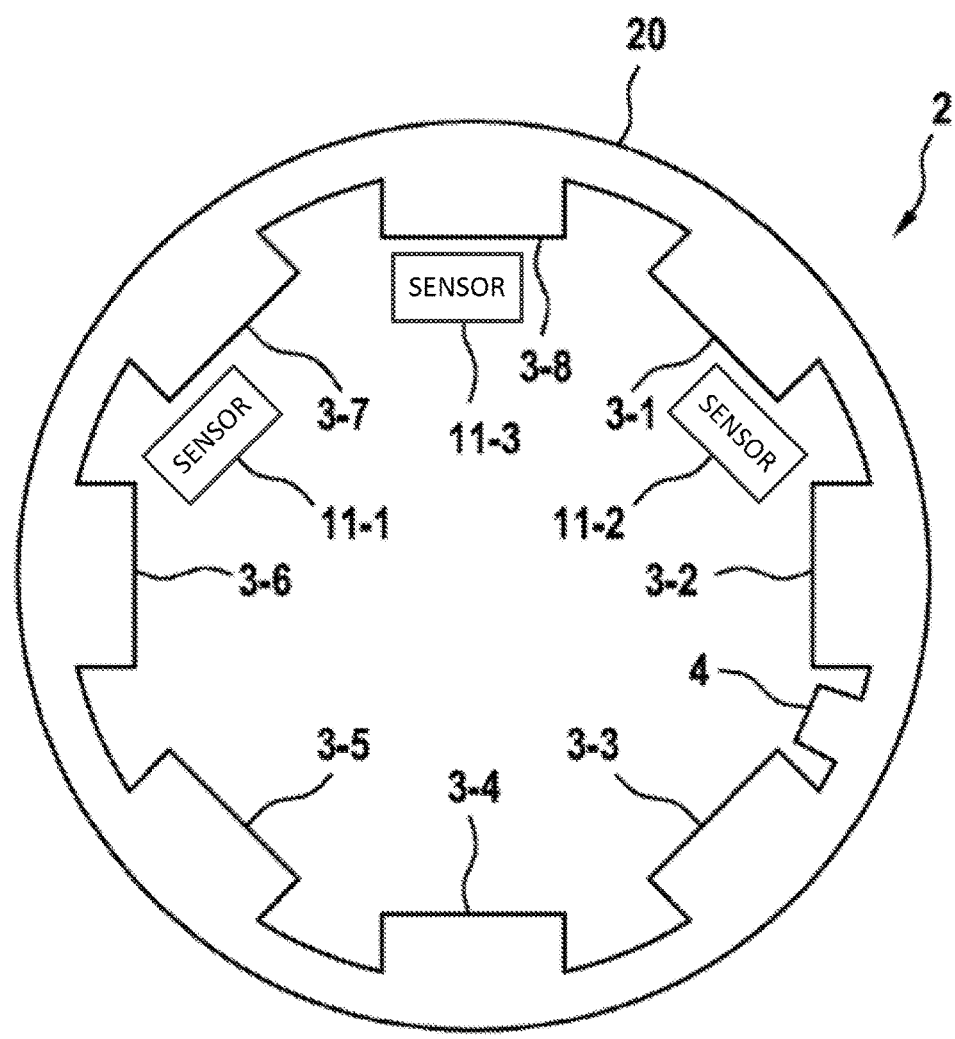
FIG. 5 shows a schematic depiction of an embodiment of the encoder wheel.

FIG. 5 shows a schematic depiction of an embodiment of an encoder wheel 2.

The encoder wheel 2 of FIG. 5 is an encoder wheel which comprises a ring 20, on the inner side of which the teeth 3-1-3-8 are uniformly disposed.

A reference marking 4 designed as a shortened tooth is furthermore disposed between the teeth 3-2 and 3-3.

Three sensors 11-1-11-3 are furthermore disposed in the ring 20. In this case, the sensor 11-3 is precisely centrally disposed below the tooth 3-8. The sensor 11-1 is disposed in such a manner that said sensor is precisely disposed at the end of the tooth 3-7 remote from the tooth 3-8. The sensor 11-2 is disposed in such a manner that said sensor is precisely disposed at the end of the tooth 3-1 remote from the tooth 3-8.

The distance between the sensors 11-1-11-3 is therefore greater than the distance between the individual teeth with respect to one another.

Further embodiments of the encoder wheel 2 are also possible.

For example, the reference marking 4 can also be designed as a tooth gap, as a tooth having an altered tooth shape, as an additionally magnetized tooth, as an altered tooth spacing or something similar.

In addition, the number of teeth 3-1-3-$n$ can vary. For example, an encoder wheel 2 comprising 60 teeth can be used. Such an encoder wheel 2 can, e.g., also have 2 reference markings.

In one embodiment, the encoder wheel 2 can, e.g., be a disk, wherein the teeth 3-1-3-*n* are disposed on the periphery of the disk or on the top side or respectively bottom side of the disk.

Although the present invention was described above using preferred exemplary embodiments, it is not limited to them but can be modified in a variety of ways. The invention can particularly be modified in diverse ways without deviating from the essence of the invention.

The invention claimed is:

1. A method for controlling an electric machine (1) having an encoder wheel (2) which has a multiplicity of teeth (3-1-3-*n*) and at least one reference marking (4), the method comprising:
   detecting (S1) dynamics of the electric machine (1), wherein the dynamics of the electric machine represent a change of speed in a rotational speed of the electric machine;
   detecting (S2) the positions of the teeth (3-1-3-*n*) on the encoder wheel (2) in relation to the at least one reference marking (4) in response to a detection of low dynamics of the electric machine, wherein the electric machine exhibits low dynamics when the rotational speed of the electric machine is constant;
   determining target positions of the teeth based on a number of teeth on the encoder wheel and a detected amount of time for a complete revolution of the encoder wheel;
   calculating a deviation between the detected positions of the teeth and the target positions of the teeth;
   calculating (S3) a rotational speed of the electric machine (1) on the basis of the detected positions and the deviation; and
   controlling (S4) the electric machine (1) on the basis of the calculated rotational speed.

2. The method according to claim 1 wherein, when detecting the positions of a respective tooth (3-1-3-*n*) on the encoder wheel (2), the time is recorded (S21) which elapses before the respective tooth (3-1-3-*n*) reaches the original position of the at least one reference marking (4).

3. The method according to claim 1 wherein, when detecting the positions of the respective tooth (3-1-3-*n*) on the encoder wheel (2), the time is recorded (S21) which elapses before the respective tooth (3-1-3-*n*) reaches the original position of the at least one reference marking (4).

4. The method according to claim 1, wherein the positions of the teeth (3-1-3-*n*) on the encoder wheel (2) are detected multiple times.

5. The method according to claim 1, wherein detecting the positions of the teeth (3-1-3-*n*) on the encoder wheel (2) in relation to the at least one reference marking (4) in response to the detection of low dynamics of the electric machine includes:
   controlling the electric machine to not apply a drive torque, a decelerating torque, or both; and
   detecting the positions of the teeth (3-1-3-*n*) while controlling the electric machine (1) to not apply the drive torque, the decelerating torque, or both.

6. The method according to claim 1, wherein detecting dynamics of the electric machine includes detecting a low dynamics operating condition of the electrical machine in response to at least one selected from a group consisting of:
   opening at least one clutch (16) between the electric machine (1) and components (17-1, 17-2) coupled to the electric machine (1);
   switching off the excitation if the electric machine (1) is an asynchronous machine or a synchronous machine with electrical excitation; and
   adjusting an active short circuit if the electric machine (1) is a permanently excited synchronous machine.

7. The method according to claim 1, wherein the positions of the teeth (3-1-3-*n*) on the encoder wheel (2) in relation to the at least one reference marking (4) are furthermore detected if the electric machine (1) is under load.

8. The method according to claim 1, wherein the rotational speed of the electric machine (1) is furthermore calculated on the basis of data of a sensor-less detection of the rotational speed.

9. The method according to claim 1, wherein calculating the rotational speed of the electric machine includes correcting the rotational speed calculated for the electric machine using the deviation.

10. A drive system (10), comprising
    an electric machine (1);
    at least one encoder wheel (2) which is mechanically coupled to the electric machine (1) and has a multiplicity of teeth (3-1-3-*n*) and at least one reference marking (4); and
    at least one sensor (11, 11-1-11-3) which is disposed next to the encoder wheel (2) and is designed to detect the teeth (3-1-3-*n*) and the at least one reference marking (4) of the encoder wheel (2) and to emit a sensor signal (12), which characterizes the movement of the teeth (3-1-3-*n*) and the at least one reference marking (4); and
    a control device which is coupled to the at least one sensor (11, 11-1-11-3) and is designed, on the basis of the sensor signal (12), to
      detect positions of the teeth (3-1-3-*n*) on the encoder wheel (2) in relation to the at least one reference marking (4) in response to a detection of low dynamics of the electric machine,
      determine target positions of the teeth based on a number of teeth on the encoder wheel and a detected amount of time for a complete revolution of the encoder wheel, and
      control the electric machine (1) at least on the basis of a rotational speed of the electric machine (1) that is calculated on the basis of the detected positions and a deviation between the detected positions of the teeth and the target positions of the teeth,
    wherein the electric machine exhibits low dynamics when the rotational speed of the electric machine is constant.

11. A vehicle comprising
    a drive system including
    an electric machine (1);
    at least one encoder wheel (2) which is mechanically coupled to the electric machine (1) and has a multiplicity of teeth (3-1-3-*n*) and at least one reference marking (4); and
    at least one sensor (11, 11-1-11-3) which is disposed next to the encoder wheel (2) and is designed to detect the teeth (3-1-3-*n*) and the at least one reference marking (4) of the encoder wheel (2) and to emit a sensor signal (12), which characterizes the movement of the teeth (3-1-3-*n*) and the at least one reference marking (4); and
    a control device which is coupled to the at least one sensor (11, 11-1-11-3) and is designed, on the basis of the sensor signal (12), to
      detect positions of the teeth (3-1-3-*n*) on the encoder wheel (2) in relation to the at least one reference marking (4) in response to a detection of low dynamics of the electric machine,
determine target positions of the teeth based on a number of teeth on the encoder wheel and a detected amount of time for a complete revolution of the encoder wheel, and
control the electric machine (1) at least on the basis of a rotational speed of the electric machine (1) that is calculated on the basis of the detected positions and a deviation between the detected positions and the target positions of the teeth,
wherein the electric machine exhibits low dynamics when the rotational speed of the electric machine is constant.

\* \* \* \* \*